(12) United States Patent
Eckersley et al.

(10) Patent No.: US 6,345,677 B1
(45) Date of Patent: *Feb. 12, 2002

(54) INDUSTRIAL TRUCK WITH A BATTERY BLOCK

(75) Inventors: Paul John Eckersley, Basingstoke; Barry Michael Warner, Winchester, both of (GB)

(73) Assignee: Linde Aktiengesellschaft (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,248

(22) Filed: Oct. 29, 1998

(30) Foreign Application Priority Data

Nov. 6, 1997 (GB) .............................................. 9723433

(51) Int. Cl.⁷ ............................ B66F 9/075; B60K 1/04; B60S 5/06
(52) U.S. Cl. ........................................ 180/68.5; 414/673
(58) Field of Search ........................ 180/68.5; 414/395, 414/396, 400, 592, 609, 673, 814; 104/34

(56) References Cited

U.S. PATENT DOCUMENTS

| | | | | |
|---|---|---|---|---|
| 1,362,019 A | * | 12/1920 | Lubeck | 104/34 |
| 2,504,885 A | * | 4/1950 | Schreck | 180/68.5 X |
| 3,014,344 A | * | 12/1961 | Arnot | 187/224 |
| 3,497,090 A | * | 2/1970 | Daniels | 104/34 |
| 3,687,484 A | * | 8/1972 | Cosby | 414/572 |
| 3,708,028 A | * | 1/1973 | Hafer | 180/68.5 |
| 3,797,600 A | * | 3/1974 | Miner | 104/34 |
| 4,026,378 A | * | 5/1977 | DePriester | 180/68.5 |
| 4,101,038 A | * | 7/1978 | Palma | 414/396 |
| 4,227,463 A | * | 10/1980 | Pfleger | 104/34 |
| 4,397,365 A | * | 8/1983 | Harbe et al. | 104/34 |
| 4,808,058 A | * | 2/1989 | Carney et al. | 414/396 |
| 5,297,645 A | * | 3/1994 | Eckersley et al. | 180/68.5 |
| 5,441,123 A | * | 8/1995 | Beckley | 180/68.5 |
| 5,452,983 A | * | 9/1995 | Parmley, Sr. | 414/396 |
| 5,520,258 A | * | 5/1996 | Kemshall | 180/68.5 |
| 5,549,443 A | * | 8/1996 | Hammerslag | 180/68.5 X |
| 5,585,205 A | | 12/1996 | Kohchi | 429/99 |
| 5,934,053 A | * | 8/1999 | Fillman et al. | 56/11.9 |
| 5,983,612 A | * | 11/1999 | Bauswell et al. | 180/68.5 X |

FOREIGN PATENT DOCUMENTS

| | | | | |
|---|---|---|---|---|
| DE | 2709994 | * | 9/1977 | 180/68.5 |
| DE | 2717768 | * | 12/1977 | 180/68.5 |
| GB | 772537 | | 4/1957 | |
| GB | 803068 | | 10/1958 | |
| GB | 1001535 | | 8/1965 | |
| GB | 1179141 | * | 1/1970 | 180/68.5 |
| GB | 2046676 | * | 11/1980 | 180/68.5 |
| GB | 2091179 | * | 7/1982 | 180/68.5 |
| JP | 62-218224 | * | 9/1987 | 180/68.5 |
| WO | 94/13508 | * | 6/1994 | 180/68.5 |

* cited by examiner

Primary Examiner—James W. Keenan
(74) Attorney, Agent, or Firm—Webb Ziesenheim Logsdon Orkin & Hanson, P.C.

(57) ABSTRACT

An industrial truck has a driving part, a load-receiving device, and at least one battery block located in the region of the driving part. At least one battery block can be removed from the driving part in the direction of one main driving direction of the industrial truck. Preferably, the battery block can be moved out of the driving part in the direction of the load-receiving device. Where the industrial truck incorporates a lifting framework, the battery block can be moved through a free space located between two pillars of the lifting framework. The industrial truck can be in the form of a reach truck.

9 Claims, 7 Drawing Sheets

INDUSTRIAL TRUCK WITH A BATTERY BLOCK

BACKGROUND OF THE INVENTION

1. Field of the Invention

The present invention relates generally to an industrial truck having a driving part, a load-receiving device and at least one battery block located in the region of the driving part.

2. Description of the Currently Available Technology

Industrial trucks of the above-described type include, for example, counterweighted fork lift trucks, reach trucks and warehouse trucks, which are typically equipped with a battery block to power the electrical drive of the truck. The battery block and various electrical units are located in the driving part of the industrial truck. Under certain conditions of use of the industrial truck, it is customary to replace a discharged battery block with a charged battery block at regular time intervals. Under other conditions of use, it is customary to leave the battery block in the industrial truck during charging. In this latter case, it is only necessary to change the battery block when there is a fault in the battery block.

Regardless of the conditions of use of the industrial truck, it is desirable to be able to change the battery block with the minimum possible effort. In order to achieve this, known arrangements provide for the battery block to be lifted upwardly out of the industrial truck by means of a crane or, for example, a fork lift truck. Other solutions are known in which the battery block can be withdrawn from the industrial truck in a sideways direction with the aid of a roller conveyor. The side opening of the industrial truck required for this usually reduces its rigidity or involves increased design costs.

Thus, the object of the present invention is to provide an industrial truck of simple construction in which the battery block can be removed from the industrial truck and installed or replaced in the industrial truck in a simple manner.

SUMMARY OF THE INVENTION

According to the present invention, there is provided an industrial truck comprising a driving part, a load-receiving device and at least one battery block located in the region of the driving part, wherein the battery block is removable from the driving part in the direction of one main driving direction of the industrial truck, for example, a forward direction or a reverse direction.

The battery block is preferably installed in the driving part in the opposite direction from which it is removed. The main driving directions are defined herein as the forward driving direction and the reverse driving direction of the industrial truck for which no steering angle is required.

Advantageously, at least one battery block may be removable from the driving part in the direction of the load-receiving device. The load-receiving device may incorporate at least one lifting mast on which, for example, a load fork is located to be movable in the vertical direction. The load fork may be raised for removing or installing the battery block in order to avoid a collision with the battery block.

It is expedient for the battery block to be removable from the driving part in the horizontal direction. Thus, movement of the battery block is not effected against its weight either during removal or during installation.

One expedient variant of the invention is obtained when the battery block can be raised at least slightly within the driving part. The raising of the battery block detaches the latter from an anchorage which prevents the battery block slipping during operation of the industrial truck.

It is particularly advantageous when a battery block located within the driving part can be raised by a device disposed outside the driving part, preferably disposed beneath the industrial truck. In practice, the raising device is located beneath the driving part and the battery block is raised. Then the battery block, together with the device, can be moved relative to the industrial truck in the appropriate direction.

It is particularly expedient when a fork lift truck is provided as the device for raising the battery block. The fork of the fork lift truck may be slid under the driving part of the industrial truck, the battery block raised by means of the fork and then withdrawn by means of the fork lift truck. The battery block may be installed in the same manner in the reverse order.

It is expedient when the industrial truck can be moved relative to the raised battery block. One particularly favorable embodiment is obtained when the industrial truck can be moved relative to the battery block by means of its propulsion drive. In this case, the industrial truck can be driven over the stationary battery block with its own propulsion drive.

According to one advantageous variant of the invention, the industrial truck incorporates a lifting framework and the battery block can be moved through a free space located between two pillars of the lifting framework. In practice, a load fork provided on the lifting framework may be raised for this operation.

In this case, it is expedient for the distance between the outsides of the two pillars of the lifting framework to correspond at least approximately to the width of the industrial truck. Thus, the pillars of the lifting mast are spaced as far apart as possible in order to create the necessary space for movement of the battery block.

It is particularly advantageous when a driver's seat of the industrial truck is disposed above the battery block. However, the industrial truck according to the invention allows any desired configuration of the space above the battery block. When the battery block is designed accordingly, an essentially flat area is created above the battery block which allows an advantageous arrangement of the driver's seat and hence an ergonomically advantageous design of the driver's position.

Particular advantages arise when the industrial truck is embodied as a reach truck. In a reach truck the load is usually loaded inside the wheelbase, and the load is only moved outside the wheelbase of the reach truck to place the load in (or remove it from) a shelf. The battery block located under the driver's position in the operating position acts as a counterweight for a load when the load is located outside the wheelbase of the reach truck. As a result, the wheels of the reach truck on the load side can be located closer to the driving part without jeopardizing the stability of the reach truck. This reduces the overall dimensions of the reach truck in the longitudinal direction, simultaneously improving the maneuverability of the truck. Moreover, the low center of gravity of the battery located beneath the driver's position, and hence the low center of gravity of the truck, results in an improved sideways stability. Thus, drivability while turning or cornering is improved.

It is expedient when the reach truck incorporates a reach mast. This means that the load can be moved together with the lifting framework in the longitudinal direction of the reach truck. Alternatively or additionally, the reach truck may incorporate a reach fork. In the alternative case, the lifting framework can be connected rigidly to the driving part. This offers design advantages, particularly when the width of the lifting framework corresponds at least approximately to the width of the industrial truck. The reach fork is used to move a load relative to the lifting framework in the longitudinal direction of the industrial truck.

DESCRIPTION OF THE PREFERRED EMBODIMENTS

For purposes of the description hereinafter, the terms "above," "below," "right," "left," "vertical," "horizontal," and derivatives and equivalents thereof shall relate to the invention as it is oriented in the drawing figures. However, it is to be understood that the invention may assume various alternative variations in step sequences except where expressly specified to the contrary. It also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 1:
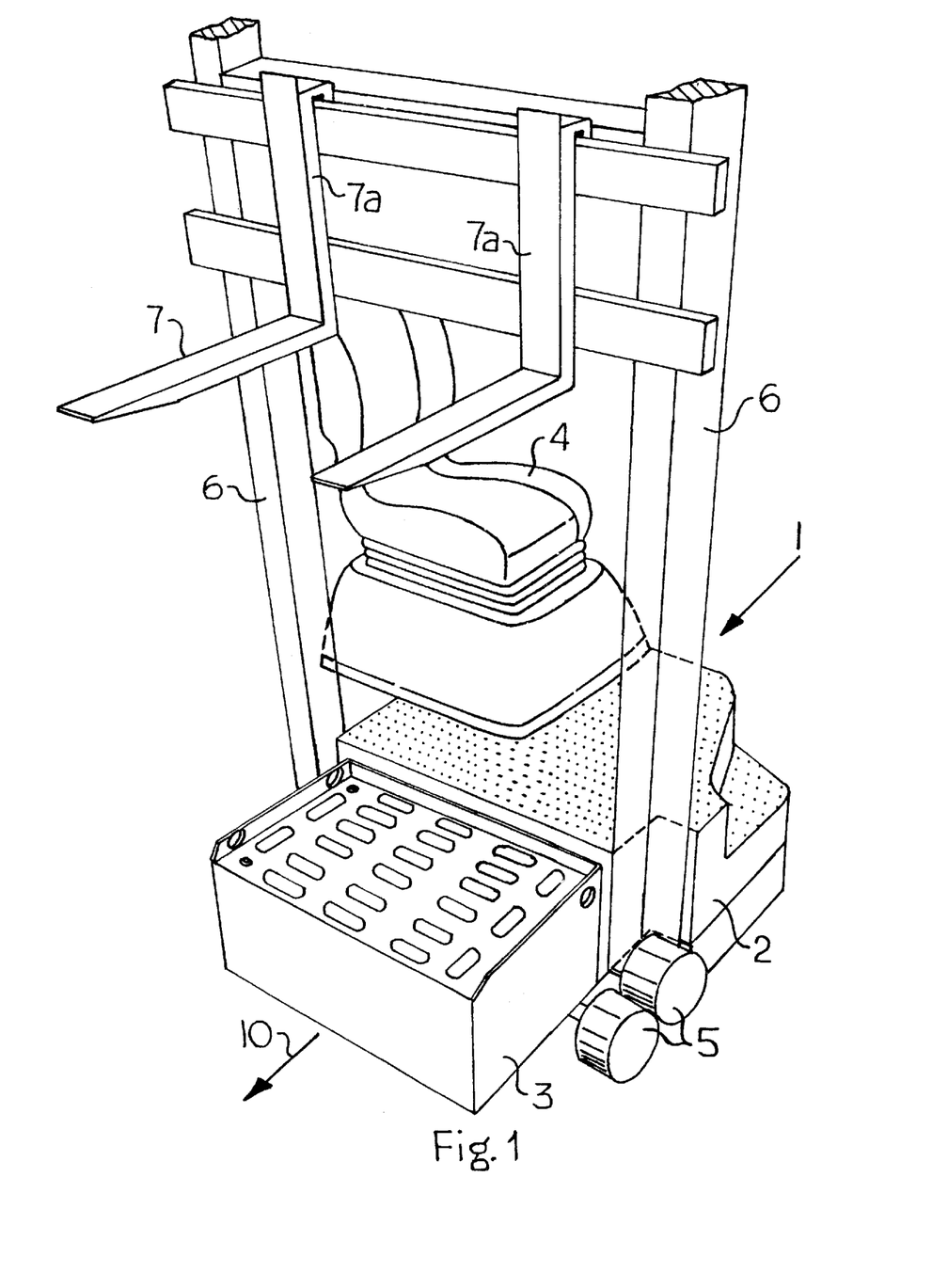
FIG. 1 is a perspective view of an industrial truck according to the invention.

Although not limiting to the scope of the invention, FIG. 1 shows an industrial truck according to the invention which is embodied as a reach truck having a reach fork. A driving part 1 of the industrial truck has a housing 2 in which a battery block 3 and various conventional components (not shown) are located during operation of the industrial truck. The top of the housing 2 forms the driver's position of the industrial truck and a driver's seat 4 is disposed on the housing 2. On the load side, the industrial truck is provided with wheels 5 disposed in front of the driving part 1 while one or two steerable driving wheels (not shown) and possibly an additional pivoting wheel (not shown) are located in conventional manner under the driving part 1. The main driving directions of the industrial truck are a first or forward direction marked with the arrow 10 and a second or reverse direction which is opposite to the forward direction.

In the embodiment shown in FIG. 1, two pillars 6 of a lifting framework are rigidly connected to the driving part 1. A load fork 7 which can be moved upwardly and downwardly on the lifting framework can be moved in the main driving directions of the industrial truck by means of a reach device 8 (see FIG. 1A). When the load fork 7 is moved rearwardly (i.e., in the opposite direction to the arrow 10) to its greatest extent, the overall center of gravity of the industrial truck and the load lies between the wheels 5. When the load fork 7 is moved forwardly, the back 7a of the load fork 7 is located forwardly of the wheels 5 so that loads can be placed, for example, on shelves.

As shown in FIG. 1, the battery block 3 can be removed from the driving part substantially horizontally in one main driving direction of the industrial truck, namely, in the direction of the arrow 10, and installed or replaced in the opposite direction and held in position in conventional manner. In the illustrated embodiment, the battery block 3 is moved through the free space present between the two pillars 6 of the lifting framework, that is, it is moved in the direction of the load-receiving device or lifting framework. The distance between the outsides of the two pillars 6 of the lifting framework corresponds substantially to the width of the industrial truck.

Thus, it is possible to move the battery block 3 relative to the stationary industrial truck. Alternatively, it is possible to secure the battery block 3 in a stationary position and to move the industrial truck relative to the battery block 3. For this operation, the movement of the industrial truck can be effected by means of its own propulsion drive. In this case, it is possible S to use the battery block 3 to be removed or installed for supplying the propulsion drive of the industrial truck with electric power. In order to facilitate removal, means, such as a fork lift truck extending beneath the industrial truck, may be used to raise the battery block 3 at least slightly within the driving part 1 beneath the driver's seat 4.

Figure 1A:
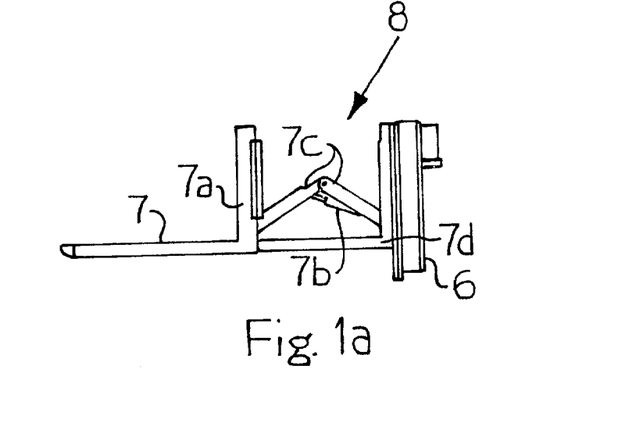
FIG. 1A is a side, elevational view of a reach device forming part of the industrial truck of FIG. 1.

FIG. 1A shows a reach device 8 for moving the load fork 7 in a forward or rearward direction. The reach device comprises a hydraulic cylinder 7b, an articulated lever 7c and a base member 7d for the fork. The base member 7d is secured to the lifting framework and can be moved upwardly and downwardly together with the load fork 7.

Figure 1B:
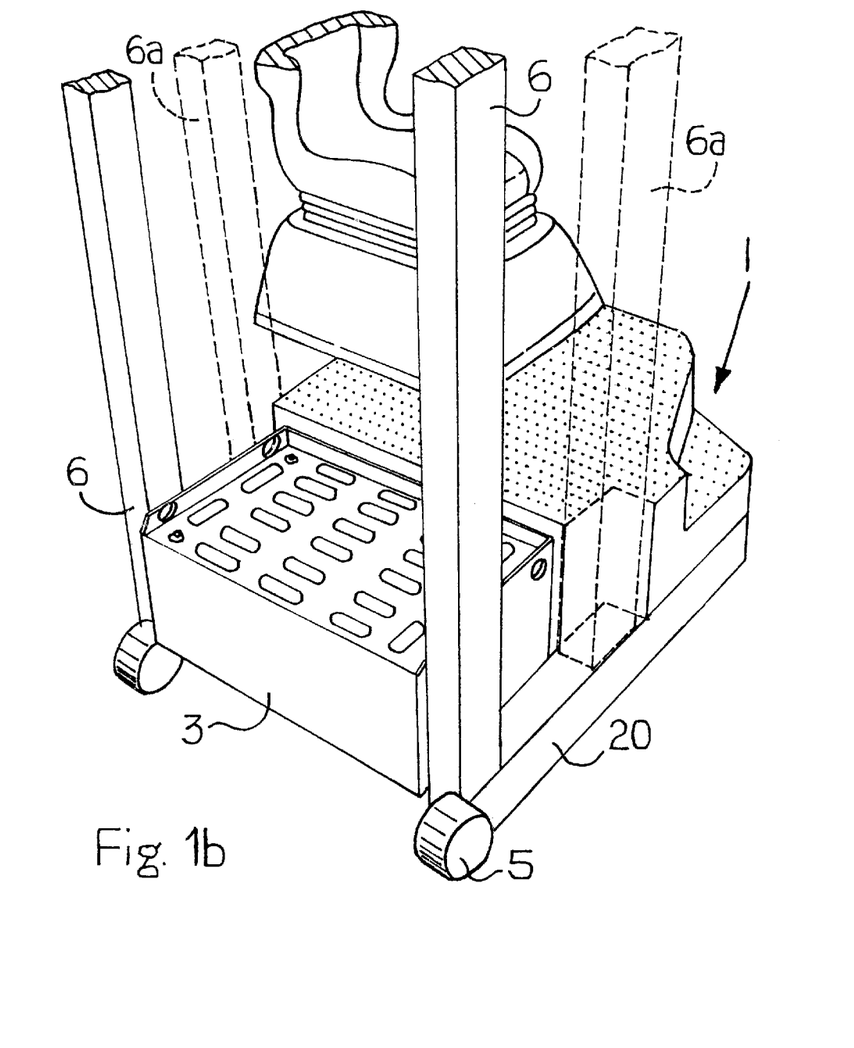
FIG. 1B is a perspective view of another industrial truck according to the present invention.

FIG. 1B shows another industrial truck according to the present invention embodied as a reach truck and incorporating a reach mast. The driving part 1 of the truck has two guide arms 20 and the pillars 6 of the lifting framework are movable along the guide arms 20 in forward and rearward directions relative to the truck. As illustrated, the pillars 6 of the lifting framework are shown in their most forward position. A rearmost position 6a of the pillars 6 is indicated in dashed lines in FIG. 1B. As shown in FIG. 1B, the battery block 3 can be removed from the driving part 1 through the free space available between the two pillars 6 of the lifting framework and between the guide arms 20.

Figure 1C:
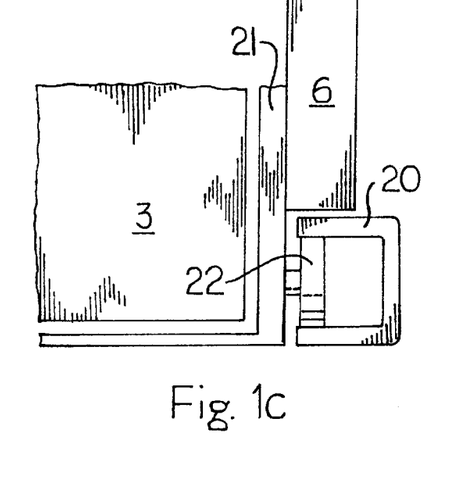
FIGS. 1C and 1D are alternative detail elevational views of part of the truck shown in FIG. 1B.
Figure 1D:
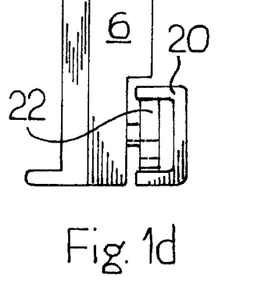

FIGS. 1C and 1D show two different options for movably connecting pillars 6 of the lifting framework to the guide arms 20. The left pillar (not shown) and the right pillar are connected to each other by means of a connecting member 21. Rollers 22, which are guided in the guide arms 20, are mounted on the connecting member 21 (FIG. 1C) or on the pillars 6 (FIG. 1D).

In the embodiment shown in FIG. 1C, the pillars 6 are located wholly above the guide arms 20. Such a construction facilitates increasing the width of the battery block 3, but results in an increased closed height for the lifting framework relative to the lift height of the truck. In the embodiment shown in FIG. 1D, the lower regions of the pillars 6 are located between the guide arms 20. Such a construction facilitates reducing the closed height of the lifting framework, but results in a reduction of the width available for the battery block 3 and correspondingly in a reduction in battery capacity.

Figure 2:
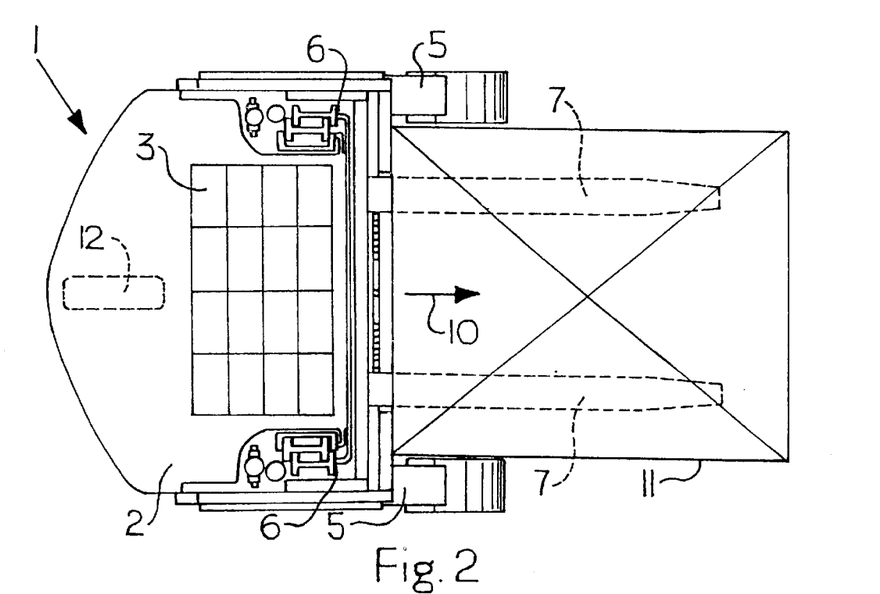
FIGS. 2 to 10 are plan views of industrial trucks according to the invention.

FIG. 2 shows a preferred embodiment of an industrial truck according to the invention. The one-piece battery block 3 can be moved out of the driving part 1 of the industrial truck in the direction of the arrow 10, i.e., in the direction of the load fork 7.

In the embodiment of FIG. 2, a steerable centrally located driving wheel 12 of the industrial truck is disposed rearwardly of the battery block 3. The onepiece battery block 3 comprises a standard component.

Figure 3:
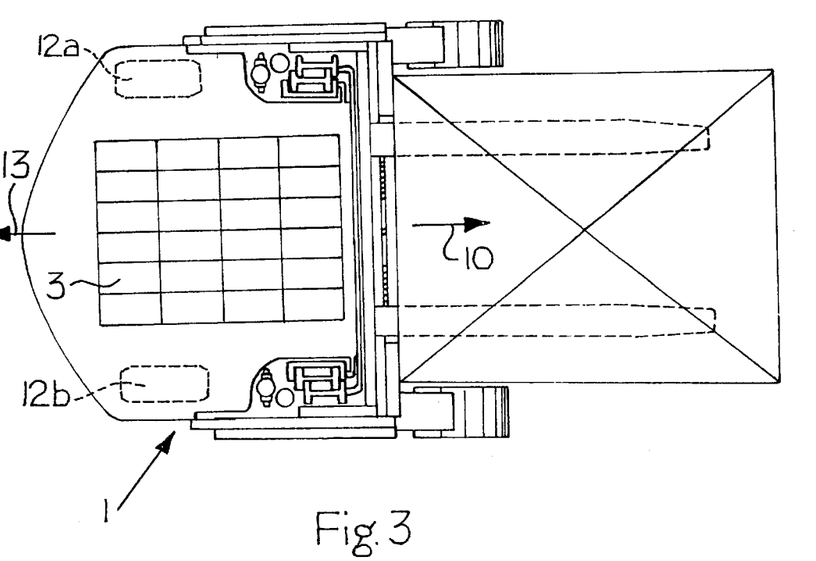

FIG. 3 shows an arrangement in an industrial truck similar to that of FIG. 2. However, in the case of the embodiment of FIG. 3 two driving wheels 12*a*, 12*b* are located one at each side of the truck. Because of the lateral spacing between the driving wheels 12*a*, 12*b*, the one-part battery block. 3 can be moved out of the driving part 1 either in the direction of the arrow 10, or in the opposite direction as shown by arrow 13.

Figure 4:
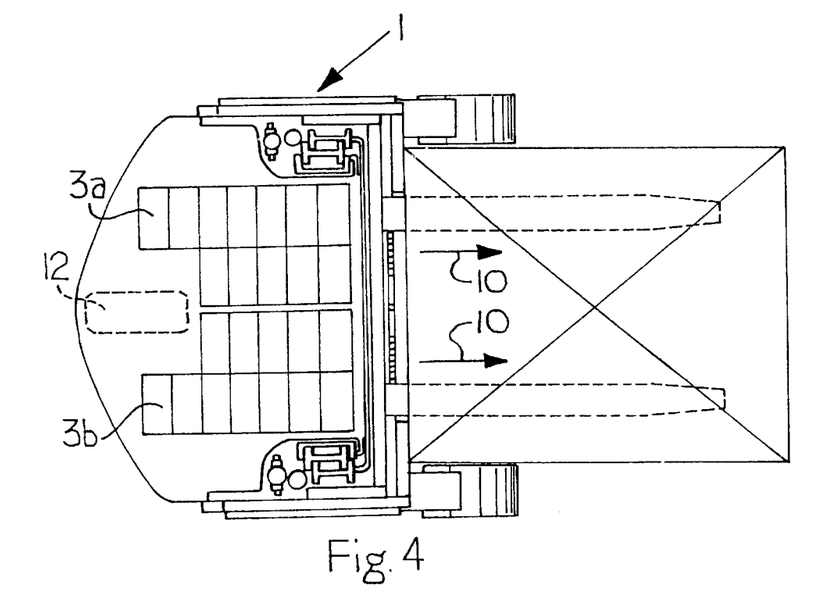

FIG. 4 shows an arrangement in an industrial truck in which the truck is provided with a centrally located driving wheel 12 and a battery block which can comprise a two-part block 3*a*, 3*b* (as shown), a three-part block or a single block. This single, two-part or three-part configuration of the battery block allows better utilization of the available space within the driving part 1.

Figure 5:
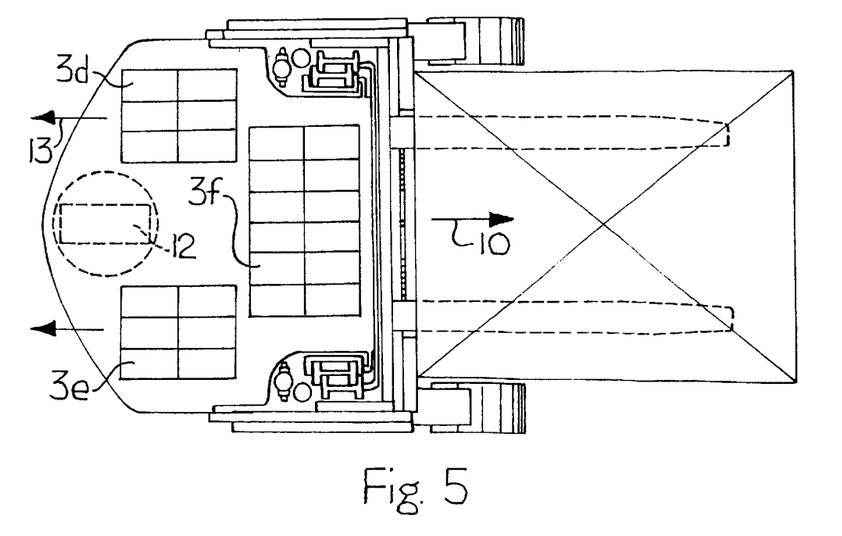

FIG. 5 shows an arrangement in an industrial truck having a centrally located driving wheel 12 and a three-part battery block 3*d*, 3*e*, 3*f*. In the embodiment illustrated in FIG. 5, three advantageously shaped battery blocks 3*d*, 3*e*, 3*f* can be used with good space utilization.

Figure 6:
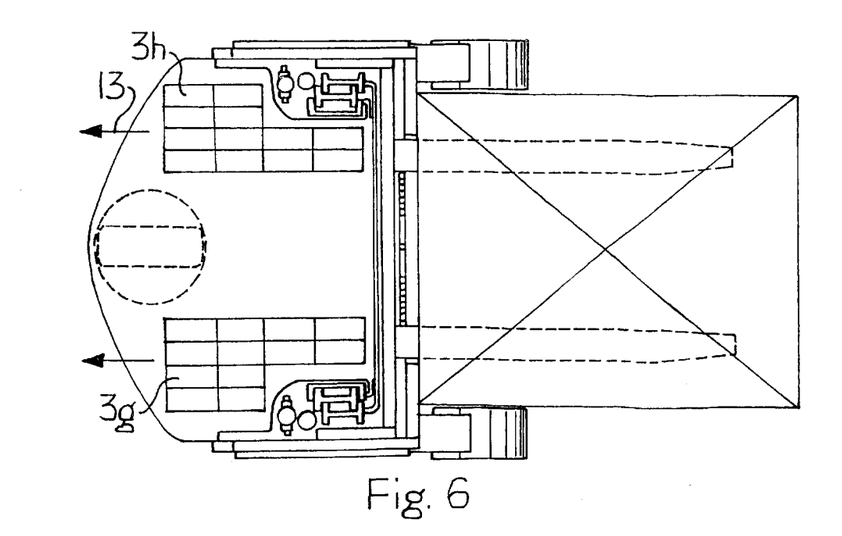

FIG. 6 shows an arrangement in an industrial truck having a centrally located driving wheel 12 and a two-part battery block 3*g*, 3*h*. In the embodiment illustrated in FIG. 6, both parts 3*g*, 3*h* of the two-part battery block can be removed in the rearward direction opposite to the location of the load, that is, in the direction of the arrow 13. Rearward removal of the battery block eliminates the restrictions which would otherwise apply to the design of the lifting mast and the load fork.

Figure 7:
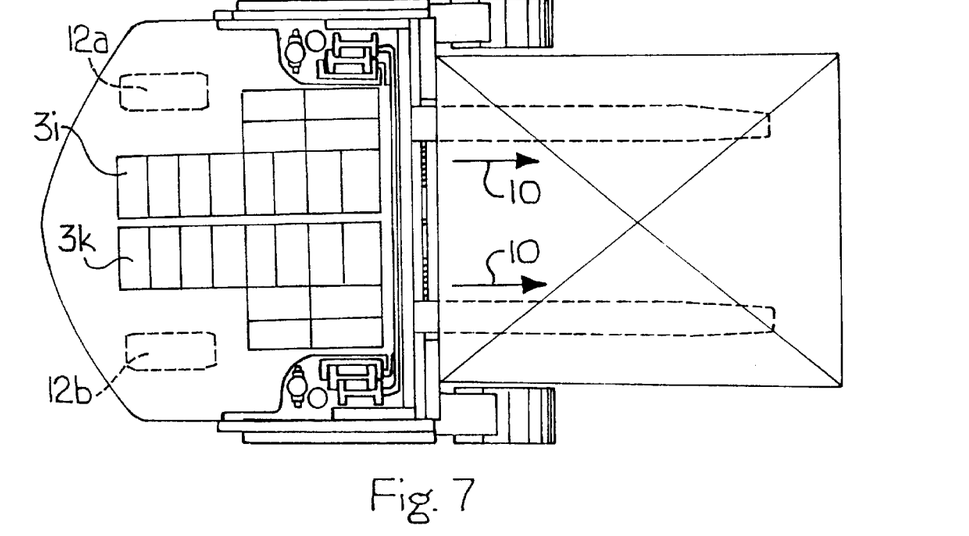

In the industrial truck according to FIG. 7, the utilization of space in an industrial truck having two laterally spaced steerable driving wheels 12*a*, 12*b* is optimized by corresponding design of a two-part battery block 3*i*, 3*k*. In the embodiment of FIG. 7, the parts 3*i*, 3*k* of the battery block can be removed by moving the parts 3i, 3k forwardly in the direction of the arrows 10. With the arrangement shown in FIG. 7, it is also possible to replace the two-part battery block 3*i*, 3*k* with a single battery block.

Figure 8:
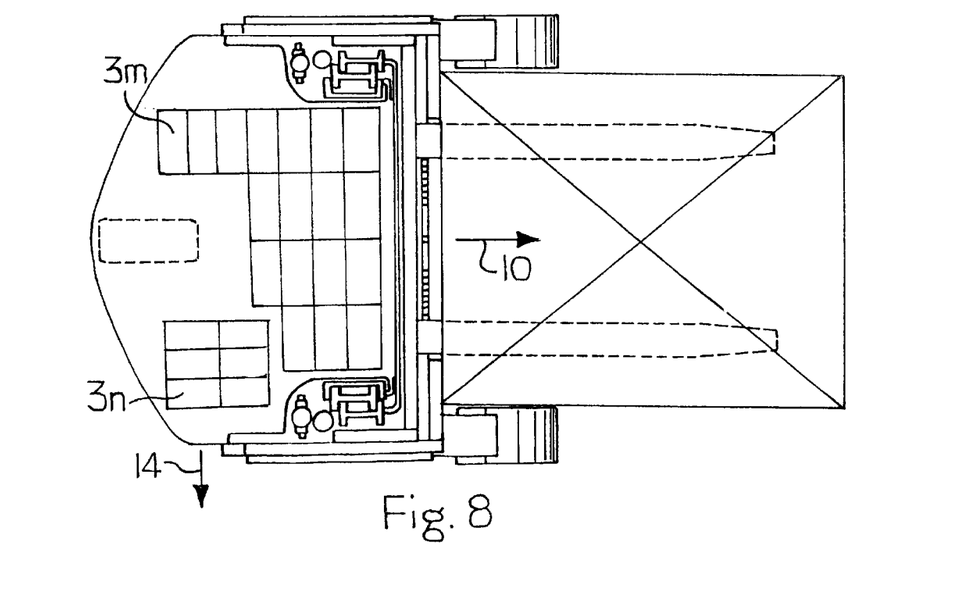

FIG. 8 shows an industrial truck in which one part of a two-part battery block 3*m*, 3*n* can be removed forwardly from the driving part 1 in the direction of the arrow 10 while the other part can be removed in a sideways (lateral) direction as illustrated by arrow 14.

Figure 9:
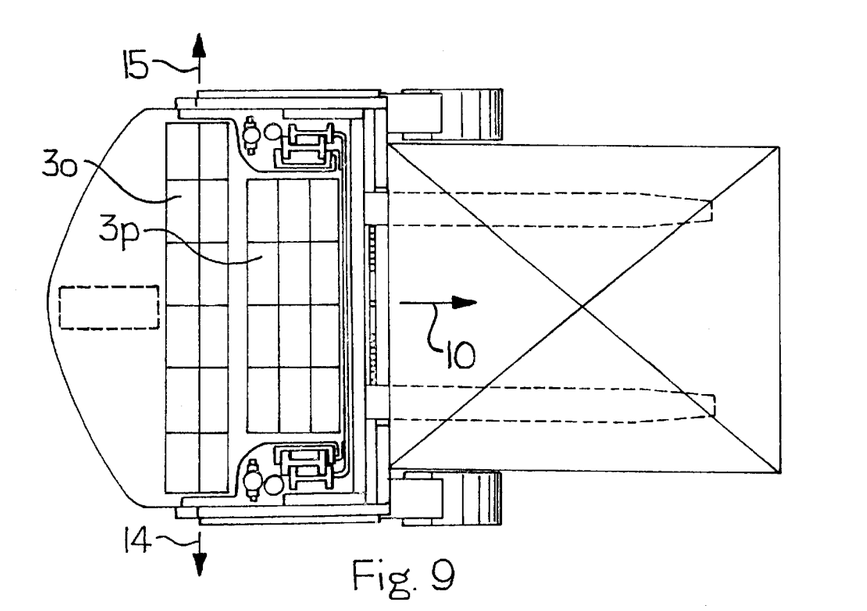

In the embodiment shown in FIG. 9, a two-part battery block 3*o*, 3*p* is provided. One part 3*p* can be removed by moving it in the forward direction as illustrated by arrow 10, while the other part 3o can be removed by moving it in either of two sideways (lateral) directions as illustrated by arrows 14 and 15.

Figure 10:
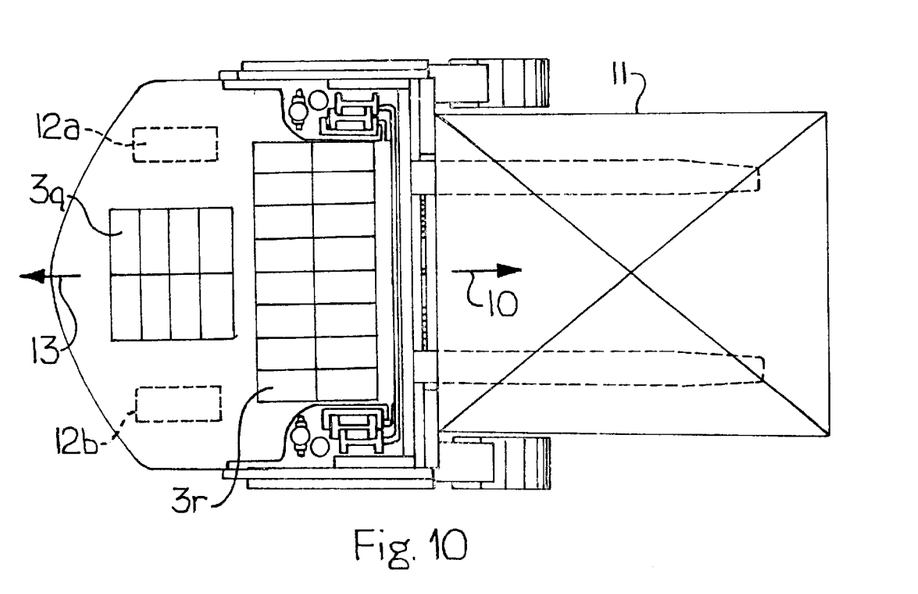

In the embodiment shown in FIG. 10, a two-part battery block 3*q*, 3*r* is provided in an industrial truck having two steerable wheels 12*a*, 12*b*. One part 3*r* can be removed in the forward direction (i.e., in the direction of the load 11) as illustrated by arrow 10, while the other part 3*q* of the battery block can be removed in the rearward direction as illustrated by arrow 13.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail hereinabove are illustrative only and are not limiting to the scope of the invention which is to be given the full breadth of the appended claims and any and all equivalents thereof.

We claim:

1. An industrial truck comprising:

a driving part having a housing, a top surface of the housing defining an operator station adapted to support an operator for the industrial truck;

a load-receiving device adjacent the driving part positioned in a first main driving direction of the industrial truck relative to the driving part, with the driving part being positioned in a second main driving direction of the industrial truck relative to the load-receiving device, the load-receiving device having a lifting framework and a load receiver movably attached to the lifting framework, wherein the lifting framework includes two pillars; and at least one battery block located in the housing of the driving part vertically beneath the top surface of the housing, wherein the at least one battery block is removable from within the housing of the driving part in one of the first and second main driving directions of the industrial truck, and wherein the battery block is movable through a free space located between the two pillars of the lifting framework.

2. An industrial truck according to claim 1, wherein the at least one battery block is removable from the driving part in the first main driving direction.

3. An industrial truck according to claim 2, wherein the battery block is removable from the driving part in a horizontal direction.

4. An industrial truck according to claim 1, wherein the battery block is removable from the driving part in a horizontal direction.

5. An industrial truck according to claim 1, wherein a distance between outsides of the two pillars of the lifting framework substantially corresponds to the width of the industrial truck.

6. An industrial truck according to claim 1, including a driver's seat of the industrial truck disposed above the battery block mounted on the top surface of the housing.

7. An industrial truck according to claim 1, wherein the industrial truck is a reach truck.

8. An industrial truck according to claim 7, wherein the lifting framework includes a research mast.

9. An industrial truck according to claim 7, wherein the load receiver includes a reach fork.

\* \* \* \* \*

UNITED STATES PATENT AND TRADEMARK OFFICE
CERTIFICATE OF CORRECTION

PATENT NO.    : 6,345,677 B1
DATED         : February 12, 2002
INVENTOR(S)   : Paul John Eckersley et al.

It is certified that error appears in the above-identified patent and that said Letters Patent is hereby corrected as shown below:

Column 5,
Line 1, "onepiece" should read -- one-piece --.
Line 8, "block. 3" should read -- block 3 -- (delete period).

Column 6,
Line 53, "research mast." should read -- reach mast. --.

Signed and Sealed this

Third Day of September, 2002

*Attest:*

JAMES E. ROGAN
*Attesting Officer*     *Director of the United States Patent and Trademark Office*